United States Patent [19]

Miura

[11] Patent Number: 4,728,424
[45] Date of Patent: Mar. 1, 1988

[54] DYNAMIC SOLID-LIQUID FILTER APPARATUS

[75] Inventor: Kaname Miura, Tokyo, Japan

[73] Assignee: International Metal Finishing, Inc., Palm Beach, Fla.

[21] Appl. No.: 785,752

[22] Filed: Oct. 9, 1985

[30] Foreign Application Priority Data

Oct. 11, 1984 [JP] Japan ................ 59-213100

[51] Int. Cl.⁴ ............................................. B01D 29/26
[52] U.S. Cl. .................................... 210/331; 210/345; 210/347; 210/398; 210/486
[58] Field of Search ...................... 210/322, 323.1, 324, 210/327, 330, 331, 332, 345, 347, 365, 486, 398; 209/361

[56] References Cited

U.S. PATENT DOCUMENTS

| | | | |
|---|---|---|---|
| 2,038,921 | 4/1936 | Blaufuss | 210/330 |
| 2,651,416 | 9/1953 | Van Der Mark et al. | 210/330 |
| 3,157,598 | 11/1964 | Rebiscoul | 210/327 |
| 3,583,567 | 6/1971 | Maestrelli | 210/330 |
| 3,846,308 | 11/1974 | Ahlquist | 210/331 |
| 3,989,629 | 11/1976 | Donovan | 210/323.1 |
| 4,224,153 | 9/1980 | Müller | 210/331 |
| 4,592,838 | 6/1986 | Christopher et al. | 210/345 |

FOREIGN PATENT DOCUMENTS

47-26758 10/1972 Japan.
47-23949 10/1972 Japan.

*Primary Examiner*—Richard V. Fisher
*Assistant Examiner*—Wanda L. Millard
*Attorney, Agent, or Firm*—Stevens, Davis, Miller & Mosher

[57] ABSTRACT

For the separation of a slurry into cake and water, a set of rotary filter discs are mounted on a hollow shaft at constant longitudinal spacings and in positions of registry with one or more rows of bores in the hollow shaft. Each filter disc has a filter cloth or like filter element enveloping a carrier disc, so that the water that has passed the filter cloth flow into the bores in the hollow shaft through a gap between the carrier disc and the hollow shaft. Arranged alternately with the filter discs are baffle plates which also are each enveloped by a filter cloth for the separation of water from the slurry. Each filter disc has one or more flow accelerating members mounted astride the peripheral edge thereof. The flow accelerating members create cavities in the slurry with the rotation of the filter discs, thus facilitating the flow of the slurry between filter discs and baffle plates.

9 Claims, 6 Drawing Figures

DYNAMIC SOLID-LIQUID FILTER APPARATUS

BACKGROUND OF THE INVENTION

My invention relates generally to filters, to solid-liquid filters, and particularly to a dynamic filter apparatus particularly well suited for the separation of slurries into a solid and a liquid. More particularly, my invention concerns improvements in a dynamic filter apparatus of the type having a plurality or multiplicity of rotary filter discs.

Japanese Laid Open Patent Applications Nos. 47-23949 and 47-26758 suggest slurry filters which, as far as I am aware, represent the prior art closest to my invention. Both of these known filters comprise a plurality of rotary filter discs nonrotatably mounted on a hollow shaft at constant longitudinal spacings, and a plurality of stationary filter discs arranged alternately with the rotary filter discs.

I object to these prior art devices because of a rapid decrease in the flow rate of the slurry through the meandering path between the rotary and fixed filter discs upon decrease in the water content of the slurry with the progress of filtration. Such a decrease in the flow rate of the slurry results in an increase in the load both on the drive motor revolving the rotary filter discs via the hollow shaft and on the pump for forcing the slurry into the filter apparatus. These problems have so far been circumvented by employing a drive motor and pump of large capacities at considerable expenses. The pumping of the slurry under increased pressure represents no satisfactory solution because of the need for the frequent replacement or repair of the seals, as well as of difficulties encountered in the removal of the cake that has stuck fast to the filter discs.

SUMMARY OF THE INVENTION

I have hereby found out a truly satisfactory, readily practicable solution to the problem of how to avoid, in a dynamic filter apparatus of the type defined, the rapid decrease in the flow rate of the slurry or like fluid with the progress of filtration.

Stated broadly, our invention provides a dynamic filter apparatus comprising a hollow shaft which is rotatably mounted within a housing and which has at least one row of bores formed therein at constant longitudinal spacings. A set of rotary filter discs are mounted on the hollow shaft for joint rotation therewith and positioned in register with the respective bores therein. Each filter disk includes a carrier disc and a meshed filter element such as filter cloth enveloping same for the passage of the filtrate (such as the water separated from the slurry) therethrough onto the surfaces of the carrier disc. A gap exists between the hollow shaft and each carrier disk, allowing the filtrate to pass into the hollow shaft through each associated bore therein. A set of baffles are mounted in fixed relation to the housing and are arranged alternately with the filter discs to regulate the flow of the slurry over the filter elements of the filter discs. Also included is at least one flow accelerating member formed on each filter disc so as to protrude therefrom. During filtration, with the filter discs in rotation with the hollow shaft, the flow accelerating members are effective to create cavities or unoccupied spaces in the slurry within the housing and hence to expedite the flow of the slurry between the filter discs and the baffles.

Preferably, the flow accelerating members are each U shaped and are mounted astride the peripheral edges of the filter discs so as to protrude both radially outwardly and in the opposite lateral directions therefrom. Also for facilitating the flow of the slurry, each filter disc may have one or more recesses defined in its peripheral edge.

Further, in a preferred embodiment, wherein each baffle takes the form of a disc having a clearance hole defined centrally therein to encircle the hollow shaft with a sufficient clearance to allow the passage of the slurry. All the disclike baffles are enveloped by respective meshed filter elements such as filter cloths to make up an additional set of filter discs, coacting with the set of rotary filter discs for a higher filtration rate. So constructed, each baffle (or additional filter disc) should also have one or more recess defined in its inside edge bounding the clearance hole to facilitate the flow of the slurry. Alternatively, each baffle should be provided with a flow accelerating member, similar to that on each filter disc, on its inside edge.

The various flow accelerating means in accordance with my invention, taken either singly or in combination, serve to realize the smooth flow of the slurry, to such an extent that a pressure difference across the filter elements can be made lower than heretofore for a given filtration rate. A pump of reduced capacity may therefore be employed for lower power consumption. A smaller size motor may also be used for driving the filter discs via the hollow shaft. Experiment has proved that the water content of the cake formed by the apparatus of my invention is appreciably lower than that according to the comparable prior art.

The above and other features and advantages of my invention and the manner of realizing them will become more apparent, and the invention itself will best be understood, from a study of the following description and appended claims, with reference had to the attached drawings showing some preferable embodiments of my invention.

DESCRIPTION OF THE PREFERRED EMBODIMENTS

I will now describe the dynamic filter apparatus of my invention as adapted for the separation of a slurry into water and cake on an industrial scale. Generally designated 10 in FIG. 1, the representative apparatus in accordance with my invention is therein shown to comprise a primary filter section 12 and a secondary filter section 14 arranged in tandem for more efficient, through filtration of the slurry. The slurry is first filtered by the primary filter section 12 and then by the secondary filter section 14.

Figure 1:
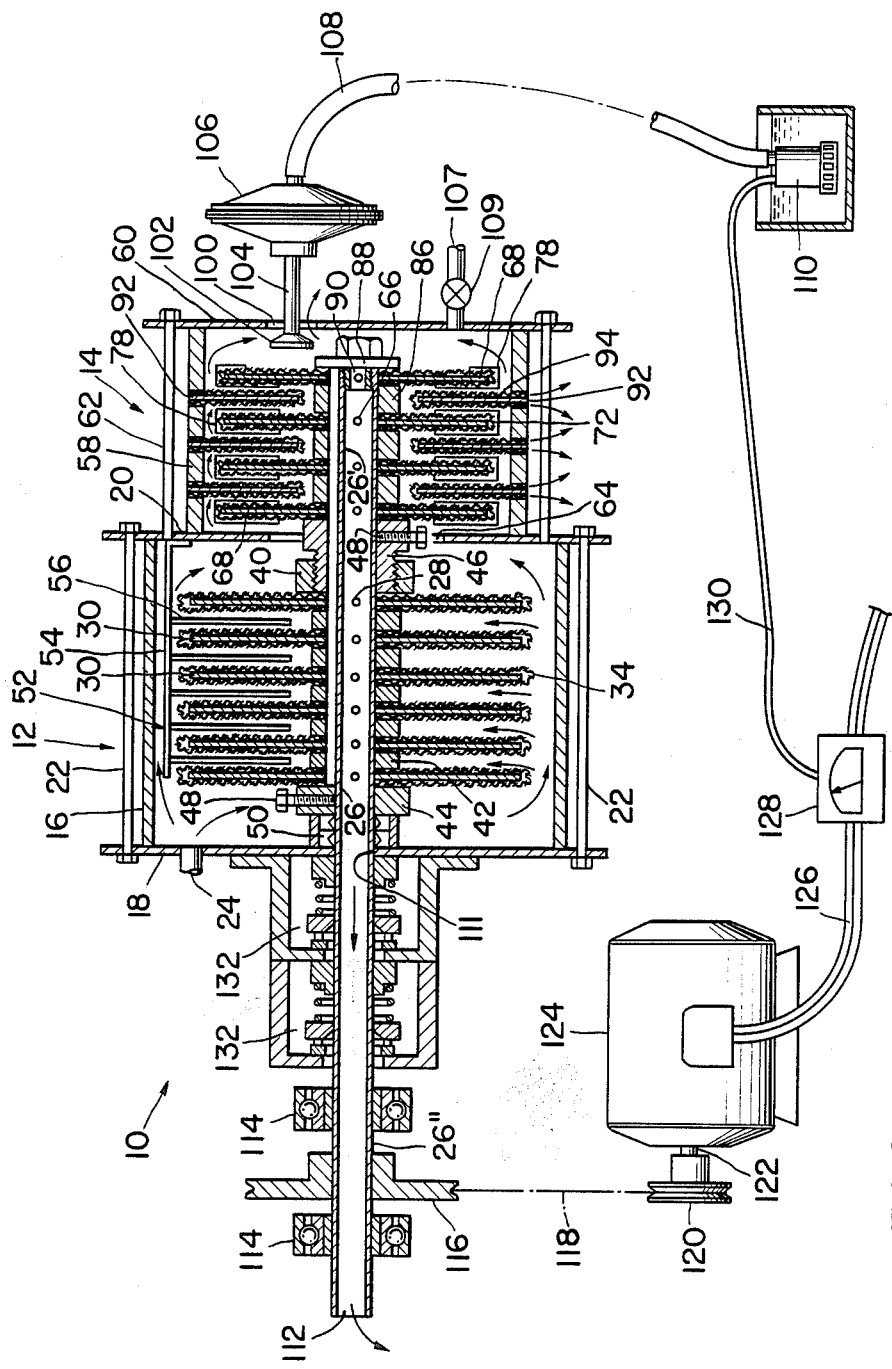
FIG. 1 is an axial section through a preferred form of the dynamic filter apparatus in accordance with my invention, shown together with the associated driving and valve actuating means adapted for automatic operation.

The primary filter section 12 has a housing 16 in the form of a hollow cylinder. Closing the opposite ends of the housing 16 are a pair of endplates 18 and 20 which are joined to each other by tie rods 22. The left hand endplate 18, as seen in FIG. 1, has a slurry inlet 24 defined therein for the introduction of the slurry to be filtered. A hollow shaft 26 is rotatably and coaxially mounted within the housing 16. At least one, preferably two or more, row of bores 28 are formed in the hollow shaft 26 at constant longitudinal spacings for the admission of water (filtrate) separated from the slurry into the shaft. A plurality of, six in this particular embodiment, filter discs 30 are mounted on the hollow shaft 26 in positions of registry with the respective bores 28.

Figure 2:
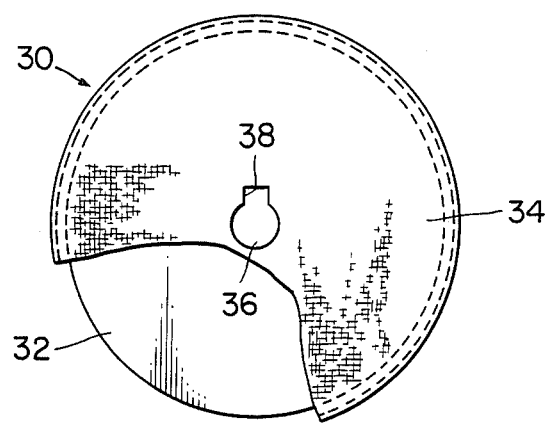
FIG. 2 is a side elevation, with a part shown broken away for clarity, of one of a first set of rotary filter discs in the apparatus of FIG. 1.

As illustrated in detail in FIG. 2, each filter disc 30 comprises a carrier disc 32 and a filter element such as relatively coarse filter cloth 34 thoroughly enveloping the exterior surfaces of the carrier dics. Filtrate passing through the filter cloth 34 flows along the exterior surfaces of the carrier disc 32 to the gap between the carrier disc and the hollow shaft 26 shown in FIG. 1. I could, however, employ meshed wire screen or other equivalent means in substitution for the filter cloth 34. The carrier disc 32 is of a solid connection and has a hole 36 defined centrally therein, with a keyway 38 extending radially outwardly therefrom to a relatively short extent.

With reference back to FIG. 1 the filter discs 30 are mounted on the hollow shaft 26 by receiving same in the central holes 36 in their carrier discs 32. A common key 40 mounted fast on the hollow shaft 26 is engaged in the keyways 38 in the carrier discs 32, so that all the filter discs 30 are capable of joint rotation with the hollow shaft 26. There must, however, be a gap between the hollow shaft 26 and each carrier disc 32, sufficient to allow the filtrate to flow therethrough into the bores 28 in the hollow shaft. Annular spacers 42 are disposed between the filter discs 30 to hold same in preassigned axially spaced apart positions on the hollow shaft 26. Further a pair of collars 44 and 46 are mounted on the hollow shaft 26 and held fast thereon as by set screws 48 for locking the series of filter discs 30 against axial displacement with respect to the hollow shaft. A seal assembly 50 is mounted between the left hand collar 44 and the left hand endplate 18 fluid tightly sealing the joint between the left hand endplate and the hollow shaft 26 extending therethrough.

The primary filter section 12 additionally comprises a scraper 52 for scraping off the cake that will collect on the filter discs 30. Generally comblike in shape, the scraper 52 comprises a support bar 54 extending parallel to the hollow shaft 26 and rigidly anchored at one end to the right hand endplate 20 of the housing 16, and a set of parallel spaced scraper teeth 56 extending from the support bar 54 into interdigital relation with the filter discs 30. I recommend polyvinyl chloride or like plastic material for the fabrication of this scraper 52.

The secondary filter section 14 has a tubular housing 58 having its left hand end held against the right hand endplate 20 of the primary filter section housing 16 in coaxial relation thereto. The right hand end of the secondary filter section housing 58 is fluid tightly closed by an endplate 60. Several tie rods 62 extend between this endplate 60 and the right hand endplate 20 of the primary filter section housing 16. A clearance hole 64 is defined centrally in the right hand endplate 20 of the primary filter section housing 16 to allow the hollow shaft 26 to extend into the secondary filter section housing 58, the hollow shaft extension being indicated at 26'. The hollow shaft extension 26' terminates just short of the right hand endplate 60 of the secondary filter section housing 58. The hollow shaft extension 26' also has at least one row of bores 66 formed therein at constant longitudinal spacings.

Mounted on the hollow shaft extension 26' for joint rotation therewith is another set of filter discs 68 which are disposed in register one with each bore 66 in the hollow shaft extension.

Figure 3:
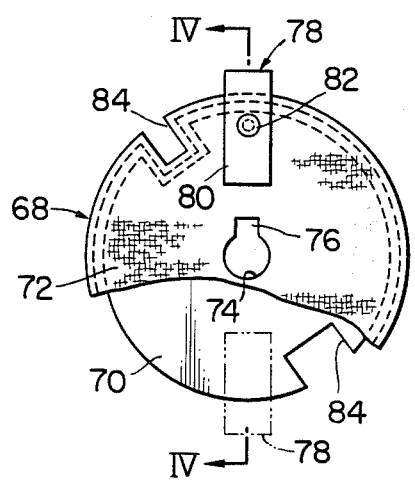
FIG. 3 is a side elevation, also with a part shown broken away for clarity, of one of a second set of rotary filter discs in the apparatus of FIG. 1.
Figure 4:
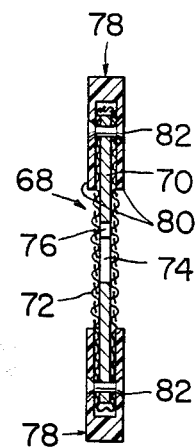
FIG. 4 is a section through the rotary filter disc of FIG. 3, taken along the line IV—IV therein.

I have illustrated the configuration of each filter disc 68 in greater detail in FIGS. 3 and 4. Like the filter discs 30 of the primary filter section 12, each filter disc 68 has a carrier disc 70 having its opposite faces thoroughly enclosed by a filter element such as, typically, a relatively coarse filter cloth 72. The carrier disc 70 has a central hole 74 to receive the hollow shaft extension 26' with a gap therebetween, and a keyway 76 extending radially from the hole 74.

Further, in accordance with a feature of my invention, one or more flow accelerating members 78 are mounted peripherally on each filter disc 68. I particularly recommend the provision of two such flow accelerating members 78 in diametrically opposite positions on each filter disc 68. Generally rectangular in shape as seen in a plan view as in FIG. 3, each flow accelerating member 78 is U shaped as seen in longitudinal section as in FIG. 4 and is mounted astraddle the peripheral edge of the filter disc 68, thus protruding both radially outwardly and in the opposite axial or lateral directions of the filter disc. The pair of legs 80 of each flow accelerating member 78, disposed on the opposite sides of the filter disc 68, are fastened thereto as by a countersunk screw 82. A plastic such as polyvinyl chloride is a preferred material of the flow accelerating members 78.

Another feature of my invention resides in one or more, two in the illustrated embodiment, recesses 84 defined peripherally in each filter disc 68. The two illustrated recesses 84 are disposed in diametrically opposite positions on the filter disc. Both flow accelerating members 78 and recesses 84 are intended to facilitate the flow of the slurry through the secondary filter section 14, as I will later explain in further detail.

A reference back to FIG. 1 will reveal that the filter discs 68 are mounted in positions on the hollow shaft extension 26' by receiving same in their central holes 74 and with annular spacers 86 interposed therebetween. The keyways 76 of the filter discs 68 engage the same key 40 as do the keyways 38 of the primary filter section filter discs 30, so that the secondary filter section filter discs 68 are likewise locked against rotation relative to the hollow shaft extension 26'. A collar 88 is screwed at 90 on to the right hand end of the hollow shaft extension 26' and coacts with the collar 46 to prevent axial displacement of the filter discs 68 relative to the hollow shaft extension.

The secondary filter section 14 further comprises annular baffle plates 92 disposed alternately with the filter discs 68 to cause the flow of the slurry over as much portions as possible of the effective filter areas of the filter discs 68. In this particularly preferred embodiment, however, the baffle plates 92 serve not only as such but also as stationary carriers or supports for an additional set of filter elements such as relatively coarse filter cloths 94. I could, therefore, refer to these baffle plates, inclusive of the filter cloths thereon, as fixed filter members, coacting with the rotary filter discs 68 for efficiently separating water from the slurry.

Figure 5:
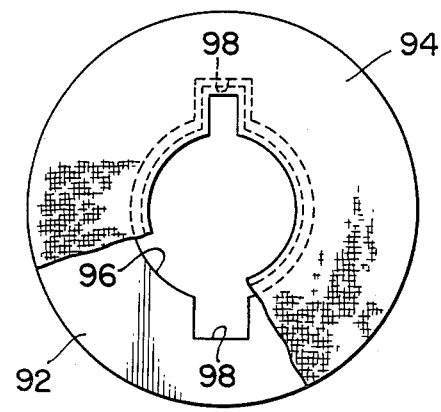
FIG. 5 is a side elevation, with a part shown broken away for clarity, of one of a set of baffle plates, having a filter cloth enveloping same, in the apparatus of FIG. 1.

As illustrated in detail in FIG. 5, each baffle plate or filter carrier 92 takes the form of a flat disc having a relatively large hole 96 defined centrally therein. The filter cloth 94 completely envelopes the baffle plate 92. For the desired smooth flow of the slurry in the secondary filter section 14, I provide one or more, preferably two, recesses 98 in the inner edge of each baffle plate 92 bounding the hole 96. The two illustrated recesses 98 are disposed in diametrically opposite positions on the baffle plate 92. The filter cloth 94 should leave these recesses uncovered.

Figure 6:
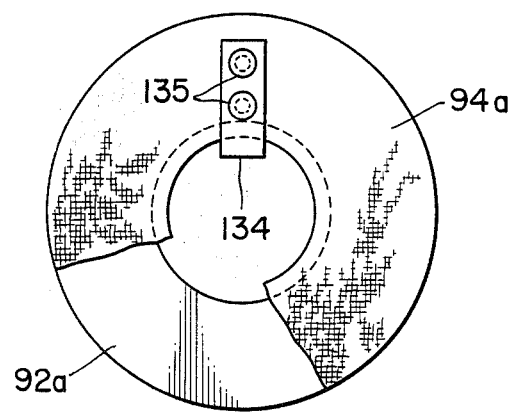
FIG. 6 is a view similar to FIG. 5 but showing an alternative form of the baffle plate.

In FIG. 6 I have shown an alternative baffle plate 92a to be used in substitution for each baffle plate 92 in the dynamic filter apparatus 10 of FIG. 1. The alternative baffle plate 92a, also having a filter cloth 94a enveloping same, has no recesses but has a flow accelerating member 134 mounted thereto, also for facilitating the flow of the slurry in the secondary filter section 14. The flow accelerating member 134 can be a U shaped plastic molding similar to the flow accelerating members 78, FIGS. 3 and 4, on the filter discs 68. The U shaped flow accelerating member 134 is mounted astride the inner edge of the baffle plate 92a, via the filter cloth 94a covering same, and is affixed to the baffle plate as by a countersunk screw 135. Thus the flow accelerating member 134 protrudes both radially inwardly and in the opposite lateral directions of the baffle plate 92a. Although I have shown only such flow accelerating member 134, I could dispose two such members in diametrically opposite positions on the baffle plate 92a.

As will be seen by referring once again to FIG. 1, the baffle plates 92 with the filter cloths 94 thereon are peripherally supported by the secondary filter section housing 58, with the extreme peripheral edges of both baffle plates and filter cloths exposed outwardly therethrough to allow the filtrate to flow or ooze out of the housing. For thus supporting the baffle plates 92 and filter cloths 94, the housing 58 may be divided into several annular segments to engage the baffle plates and filter cloths therebetween. These housing segments with the right hand endplate 60 can be readily joined together by the tie rods 62. The baffle plates 92 mounted in this manner are of course concentric with the housing 58, alternate with the filter discs 68, and surround the spacers 86 on the hollow shaft extension 26' with clearances sufficient to allow unimpeded flow of the slurry therebetween.

The secondary filter section housing 58 has a cake outlet 100 formed in its endplate 60 for the discharge of the cake as well as the condensed slurry. The cake outlet 100 is normally closed by a on off valve such as a poppet 102. This poppet valve has a stem 104 coupled to expansible bellows 106 thereby to be actuated into and out of fluid tight engagement with the annular edge of the endplate 60 bounding the cake outlet 100. The bellows 106 communicates by way of a conduit 108 with a submerged water pump 110. When electrically turned on, in a manner yet to be described, the water pump 110 delivers water under pressure into the bellows 106, thereby causing its expansion with the consequent opening of the cake outlet 100 by the poppet valve 102.

The endplate 60 of the secondary filter section housing 58 is further provided with a drain 107 in the vicinity of its lowermost part. The drain 107 has a cock 109.

The hollow shaft 26 of the primary filter section 12 has a leftward extension 26" protruding from its housing 16 through a hole 111 in its endplate 18. The leftward hollow shaft extension 26" terminates in a filtrate outlet 112 for the recovery of the water that has been filtered from the slurry. In the immediate vicinity of this filtrate outlet 112 there are a pair of bearings 114 rotatably supporting the hollow shaft extension 26".

Nonrotatably mounted on the hollow shaft extension 26", in a position intermediate the pair of bearings 114, is a driven pulley 116 which is coupled via an endless belt 118 to a drive pulley 120 on the output shaft 122 of an electric drive motor 124. Thus the rotation of the drive motor 124 results in that of the hollow shaft 26 inclusive of its extensions 26' and 26". The drive motor 124 is coupled to a source of electric energy, not shown, via a cable 126 having a meter type relay 128. This relay is coupled via a cable 130 to the aforesaid water pump 110 for automatically setting same into and out of rotation depending upon the load on the drive motor 124.

FIG. 1 also shows two mechanical seal assemblies 132 disposed in series around the leftward hollow shaft extension 26" and held against the left hand endplate 18 of the primary filter section 12. Filled with water or oil, the seal assemblies 132 serve to positively seal the gap between endplate 18 and hollow shaft 26 against slurry leakage.

OPERATION

For setting into operation the dynamic filter apparatus 10 in accordance with my invention, the drive motor 124 may be energized from the unshown power supply, thereby causing the rotation of the hollow shaft 26 via the pulleys 116 and 120 and belt 118. As the hollow shaft 26 with its extensions 26' and 26" revolves, so will the first set of filter discs 30 of the primary filter section 12 and the second set of filter discs 68 of the secondary filter section 14. The slurry to be filtered may be pumped continuously into the primary filter section housing 16 through the slurry inlet 24. I have indicated by the arrows in FIG. 1 the paths of the slurry through the primary and secondary filter sections 12 and 14. Contrary to the showing of FIG. 1, the slurry outlet 100 is held closed by the poppet 102 during the normal filtering operation, as then the water pump 110 is inactive, holding the bellows 106 contracted.

As the slurry flows through the primary filter section 12, the water contained therein will penetrate the filter cloths 34 of the revolving filter discs 30. Subsequently streaming down the carrier discs 32, the water will then flow into the hollow shaft 26 through the annular gaps between hollow shaft and carrier disks and through the row or rows of holes 28 in the hollow shaft. Then the water will flow out of the hollow shaft 26 from its open left hand end 112, perhaps to be collected in some receptacle or to be conducted to a desired place of discharge via additional piping or the like.

The cake deposited on the filter cloths 34, which in fact will still be in the state of slurry, will be constantly scraped off by the scraper teeth 54 as the filter discs 30 rotate in sliding engagement therewith. The filter cloths 34 will thus be constantly exposed to the flow of the slurry for the enhancement of the filtration rate. Being molded of polyvinyl chloride or like plastic material, the scraper 52 will not tear or rapidly wear the filter cloths 34. The filter cloths when worn out with the lapse of time are readily replaceable.

After having been thus filtered at the primary filter section 12, the slurry of the reduced water content and, in consequence, of reduced fluidity will flow into the secondary filter section 14 through the central opening 64 in the right hand endplate 20 of the primary filter section housing 16. At this secondary filter section 14 the slurry will flow through the meandering paths between the interdigitating filter discs 68 and baffle plates 92, the latter also having the filter cloths 94 as the additional filter elements in this particular embodiment. The slurry is therefore filtered by both the filter cloths 72 of the filter discs 68 and the filter cloths 94 on the baffle plates 92.

The water that has passed the filter cloths 72 on the carrier discs 70 will flow into the hollow shaft extension 26' through the annular gaps between carrier discs and hollow shaft extension and through the one or more rows of bores 66 in the hollow shaft extension. The water thus admitted into the hollow shaft extension 26' will also flow toward the water outlet 112.

Passing the filter cloths 94 on the baffle plates 92, on the other hand, the water will stream down the baffle plates and will flow out of the secondary filter section housing 58 through the gaps between its constituent annular segments and the baffle plates.

The dual filtering action thus offered by the revolving and stationary filter cloths 72 and 94 at the secondary filter section 14 affords a highly effective separation of water from the slurry, rapidly caking same. The cake will settle to and accumulate on the bottom part of the secondary filter section housing 58. The accumulation of the cake will gradually increase the load on the drive motor 124 via the hollow shaft 26 and the belt and sprocket arrangement 116, 118 and 120. Then, as the power consumption of the drive motor 124 builds up to a predetermined limit, the meter type relay 128 will turn on the submerged water pump 110, causing same to deliver water under pressure into the bellows 106. The consequent expansion of the bellows 106 unseats the poppet valve 102 and so opens the cake outlet 100 in the endplate 60 of the secondary filter section housing 58. The accumulated cake will then flow out of the outlet 100.

It is particularly noteworthy in conjunction with the secondary filter section 14 that the flow accelerating members 78 on the rotary filter discs 68 serve to create cavities in the slurry within the housing 58. Such cavities provide free passageways for the slurry, expediting its flow through the meandering paths within the housing 58. The flow of the slurry will be further accelerated if each filter disk 68 is provided with one or more peripheral recesses 84 and/or if each baffle plate 92 is provided with one or more internal recesses 98, as in FIG. 5, or with one or more flow accelerating members 134 as in FIG. 6. The recesses 84 and 98 provide partial shortcuts through the filter disks 68 and baffle plates 92 for the slurry. As I have confirmed by experiment, the provision of these flow accelerating means practically eliminates the possibility that the filter apparatus 10 be prematurely overloaded by the settling of the condensed slurry between filter discs 68 and baffle plates 92, with the consequent impediment of the revolution of the filter discs 68.

The filter apparatus 10 requires periodic cleaning, whenever the filter cloths are clogged to such an extent as to result in a significant decrease in the filtration rate. The pumping of the slurry into the apparatus may be suspended, and the drive motor 124 may be maintained in rotation. Since the slurry has been filtered under relatively low pressure, not only the cake on the filter cloths 34 of the primary filter section 12 but also that on the filter cloths 72 and 94 of the secondary filter section 14 is sufficiently fluid to come off the filter cloths by the continued rotation of the filter discs 30 and 68. Then the drain cock 109 may be opened, and the pumping of the slurry may be resumed. The cake that has fallen off the filter cloths will then be discharged through the drain 107 with the fresh slurry. A usual cleaning of the filter apparatus 10 has now been completed. As desired or required, however, service water may be introduced from the slurry inlet 24 in lieu of fresh slurry.

I believe that the foregoing has made clear that the slurry is effectively filtered in two successive steps taking place at the primary and secondary filter sections 12 and 14. Experiment has proved that the water content of the cake deposited on the filter cloths 68 and 94 at the secondary filter section 14 is as low as 70 percent, compared with approximately 80 percent according to the aforementioned prior art devices. The cake of such reduced water content is of course easier of disposal such as drying.

As an additional advantage, since the slurry to be filtered is supplyed under comparatively low pressure, the housings and other associated parts of the apparatus need not be of very sturdy construction but can be relatively simple and inexpensive. Indeed, in the illustrated filter apparatus 10, the housings 16 and 58 lend themselves to ready disassemblage upon removal of the tie rods 22 and 62, as for repair or replacement of parts.

It will also be appreciated that the numbers of the two sets of filter discs 30 and 68 are variable by increasing or decreasing the thicknesses of the spacers 42 and 86. The numbers of the filter discs 30 and 68 may be changed to suit each particular application of the filter apparatus.

The ease of fabrication and inexpensiveness of the filter discs 30 and 68 is an additional advantage of my invention. Formed by merely enveloping the carrier discs 32 and 70 with the filter cloths 34 and 72, the filter discs are easy to manufacture to close dimensional tolerances. The baffle plates 92 can also be readily turned into additional filter elements by enclosing same with the filter cloths 94. Still further, because of the minimal axial dimensions of the filter discs 30 and 68 and baffle plates 92, the axial dimension of the complete apparatus 10 can also be reduced to a minimum for given spacings between the filter discs 30 and between the filter discs 68 and baffle plates 92. These spacings should be appropriately small for effective filtration under low pressure.

Although I have shown and described my invention in terms of but one embodiment and a slight modification thereof. I recognize, of course, that my invention could be embodied in other forms in conformity with the borad teachings hereof. The above disclosed embodiments are also susceptible to a variety of modifications or alterations within the usual knowledge of the skilled artizans. For example, the cake outlet 100 may be opened and closed by such valve actuators as a fluid operated cylinder or solenoid, instread of by the hydraulically activated belows.

I claim:

1. A dynamic filter apparatus for the separation of a slurry into solid and liquid comprising:
    (a) a housing having a slurry inlet for admitting the slurry to be filtered;

(b) a hollow shaft rotatably mounted within the housing and having at least one row of bores formed therethrough at constant longitudinal spacings;

(c) a plurality of rotary filter discs mounted on the hollow shaft for joint rotation therewith and positioned in register with the respective bores in the hollow shaft, each filter disc comprising a carrier disc of solid construction and a meshed filter element enveloping the exterior surfaces of the carrier disc for the passage of filtrate therethrough onto the surfaces of the carrier disc;

(d) a gap between the hollow shaft and each carrier disc for the passage of the filtrate into the hollow shaft through the bores therein;

(e) a plurality of baffles mounted in fixed relation to the housing and arranged alternately with the filter discs to regulate the flow of the slurry over the filter elements of the filter discs; and (f) at least one flow accelerating member formed on each filter disc so as to protrude therefrom, the flow accelerating members being effective to create cavities in the slurry within the housing and hence to expedite the flow of the slurry between the filter discs and the baffles.

2. The dynamic filter apparatus as recited in claim 1, wherein the flow accelerating member is U shaped and is mounted astride the peripheral edge of each filter disc so as to protrude both radially outwardly and in the opposite lateral directions therefrom.

3. The dynamic filter apparatus as recited in claim 1, wherein each filter disk has at least one recess defined peripherally therein.

4. The dynamic filter apparatus as recited in claim 1, wherein each baffle is in the form of a plate having a clearance hole defined therein to encircle the hollow shaft with a sufficient clearance to allow the passage of the slurry, wherein each baffle is enveloped by a meshed filter element to make up a filter member, and wherein each baffle with the filter cloth thereon is peripherally exposed outwardly through the housing so as to allow only the filtrate to flow out of the housing.

5. The dynamic filter apparatus as recited in claim 4, wherein each baffle has at least one recess defined in its inside edge bounding the clearance hole to facilitate the flow of the slurry.

6. The dynamic filter apparatus as recited in claim 4, wherein each baffle has at least one flow accerating member formed protrudingly on its inside edge defining the clearance hole.

7. The dynamic filter apparatus as recited in claim 6, wherein the flow accelerating member is U shaped and is mounted astride the inner edge of each baffle so as to protrude both radially inwardly and in the opposite lateral directions therefrom.

8. A dynamic filter apparatus for the separation of a slurry into solid and liquid, comprising:

(a) housing means adapted to provide a primary and a secondary filter section in constant communication with each other, the housing means having a slurry inlet for admitting the slurry to be filtered into the primary filter section;

(b) a hollow shaft rotatably mounted within the housing means so as to extend through both the primary and the secondary filter sections, the hollow shaft having first and second rows of bores formed therethrough at constant longitudinal spacings, the first row of bores being disposed at the primary filter section and the second row of bores at a secondary filter section;

(c) a set of first filter discs of solid construction mounted on the hollow shaft for joint rotation therewith and positioned in register with the first row of bores in the hollow shaft, each first filter disc comprising a first carrier disc and a first meshed filter element enveloping the exterior surfaces of the first carrier disc for the passage of filtrate therethrough onto the surfaces of the first carrier disc;

(d) a gap between the hollow shaft and each first carrier disc for the passage of the filtrate into the hollow shaft through the first row of bores therein;

(e) a set of second filter discs of solid construction mounted on the hollow shaft for joint rotation therewith and positioned in register with the second row of bores in the hollow shaft, each second filter disc comprising a second carrier disc and a second meshed filter element enveloping the exterior surfaces of the second carrier disc for the passage of filtrate therethrough onto the surfaces of the second carrier disc;

(f) a gap between the hollow shaft and each second carrier disc for the passage of the filtrate into the hollow shaft through the second row of bores therein;

(g) a plurality of baffle plates mounted in fixed relation to the housing means so as to loosely encircle the hollow shaft and arranged alternately with the second filter discs to provide therebetween a meandering path for the slurry;

(h) each baffle plate being enveloped by a third meshed filter element and being peripherally exposed through the housing means so as to allow the filtrate that has passed the third filter element to flow out of the housing means; and (i) at least one flow accelerating member formed on each second filter disc so as to protrude therefrom, the flow accelerating members being effective to create cavities in the slurry in the secondary filter section of the housing means and hence to expedite the flow of the slurry between the second filter discs and the baffle plates.

9. The dynamic filter apparatus as recited in claim 8, further comprising:

(a) drive means for imparting rotation to the hollow shaft;

(b) an on off valve for normally holding closed a cake outlet in the secondary filter section of the housing means;

(c) valve actuator means for actuating the on off valve so as to cause same to open the cake outlet; and (d) means for sensing the energy being consumed by the drive means and, when the energy consumption of the drive means builds up to a predetermined limit, for causing the valve actuator means to actuate the valve for opening the cake outlet.

* * * * *